Sept. 10, 1963 R. A. HEISLER 3,103,314
HOLDING MEANS FOR HIGH INTENSITY LAMPS
Filed Oct. 25, 1961 6 Sheets-Sheet 1

Fig. 1

INVENTOR.
Raymond A. Heisler

Sept. 10, 1963 R. A. HEISLER 3,103,314
HOLDING MEANS FOR HIGH INTENSITY LAMPS
Filed Oct. 25, 1961 6 Sheets-Sheet 3

INVENTOR.
Raymond A. Heisler

INVENTOR.
Raymond A. Heisler

United States Patent Office 3,103,314
Patented Sept. 10, 1963

3,103,314
HOLDING MEANS FOR HIGH INTENSITY LAMPS
Raymond A. Heisler, 122 Surrey Drive, Wayne, N.J.
Filed Oct. 25, 1961, Ser. No. 147,585
9 Claims. (Cl. 240—1.3)

This invention relates to new and improved holding means for high intensity lamps and more particularly to those used primarily in photography.

As the popularity and use of the small movie camera has increased, particularly in the so called "home movie" field, so also has the demand increased for a small, concentrated, easily handled light source. To secure an adequate amount of light it has often been necessary to use a cluster of lamps mounted either on a bar or separately. Those light sources that are not movable with the camera tend to limit the effective use of the camera; whereas, those light sources that are hand held in combination with the camera enable the user to move freely as desired.

The use of light bars and other multiple light holders often are inconvenient to use because of their size. This inconvenience has created a demand for a small, high-intensity light source that is light in weight, and that can also be plugged into any electrical convenient outlet. Such a light source should require a minimal amount of storage space and handling.

The developing of the small "sealed beam" style bulb into a high output light source, conveniently powered by either A.C. or D.C. current has provided one form of such concentrated light source. In the use of such high-output lamps effecting a concentrated light source the proper dissipation of heat is a serious problem. Other factors that must be considered in the use of high intensity lamps are: proper protection to the lamp as regards the glass or similar shell; shock damage to the internal filament construction; protection of the user from electrical shock and heat.

In the manufacture of a suitable holding means for such high intensity lamps, economics require the use of low cost materials. Aesthetic appearance and high volume production virtually require the use of mouldable materials among which are those made from thermo-setting phenolic or similarly mouldable material. To use such plastic type materials for holding lamps with such high heating propensity requires a new concept in the making of a satisfactory holding means.

An object of this invention is to provide a safe holding means for high intensity lamps, the combination being readily usable with the conventional small home movie camera.

A further object is to provide a support for the lamp unit in which a shock resistant means is provided, and in which the heat is dissipated in such a manner that the user is protected.

A further object is to provide a holder for a high intensity lamp, said holder providing a large amount of protection to the lamp from accidental damage.

Another intent is to provide a light source holder of minimal size and of great convenience and wide adaptability in use with the many varieties and models of cameras as used in photography.

A further object is to provide a light source holder whose head is tiltable in relation to the handle.

A further object is to provide a holding means easily made of durable materials and economical of manufacture.

A further object is to provide a light source holder in which many of the components may be made of low cost, thermo-setting plastics.

A further object is to provide a light source holder adaptable for mounting on top of cameras.

A further object is to provide a light source holder with a heat reflective shield.

A further object is to provide a protective shell with a two-fold purpose. First; to shield the lamp bulb, the attached electrical connections, and associated components from physical damage. Second; to protect the operator from electrical shock, and to a large extent from accidental burn.

A further object is to support the lamp by certain resilient means so as to drastically reduce the potential damage to the lamp filament as well as the possible cracking or breaking of the glass envelope. Also it is an intent to further reduce the hazard of accidental burning to the user as well as to extend the probable life of the lamp by providing certain heat dissipating means.

The advantages of a hand held light source is readily apparent when compared to the inconvenience of setting up and using a multiplicity of lights separately located. Therefore a further object is to provide a single lamp bulb in a small compact housing with the illuminative equivalent or a superiority over the various multi-lamp portable light bar units now commonly used.

While the inventive concept involved is capable of receiving a variety of mechanical expressions, those preferred for the purpose of illustrating the invention are shown in the accompanying drawings in which like designating characters refer to corresponding parts through the several views in which.

Figure 1:
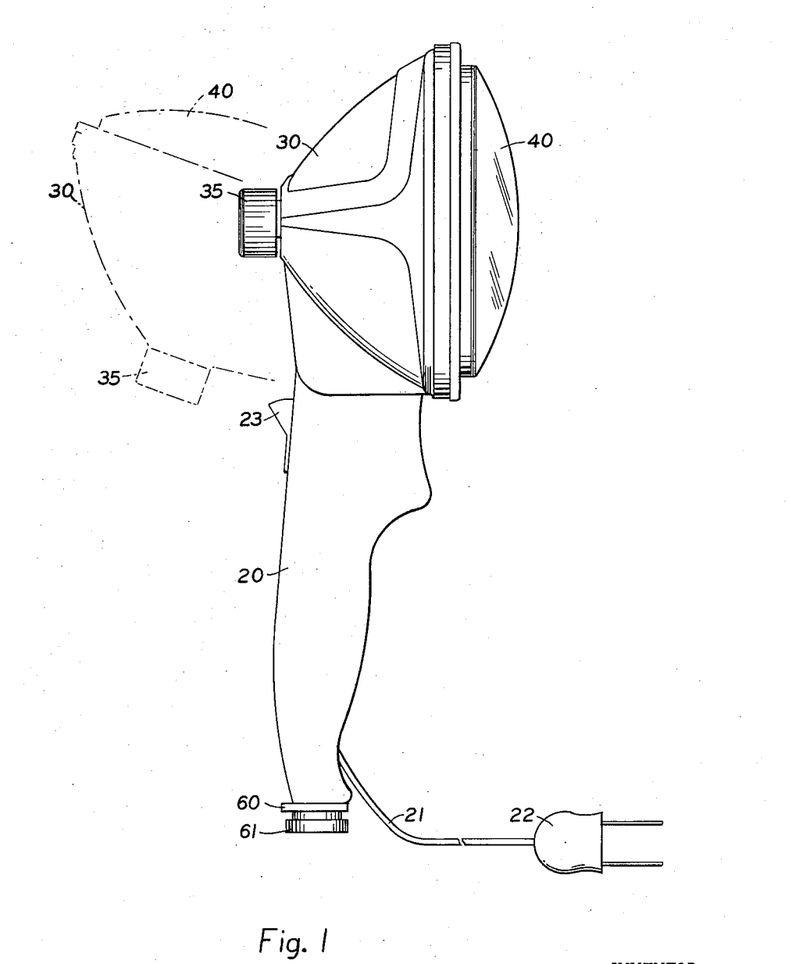
FIGURE 1 is a side view of the assembled holder with the lamp in place.
Figures 2, 4:
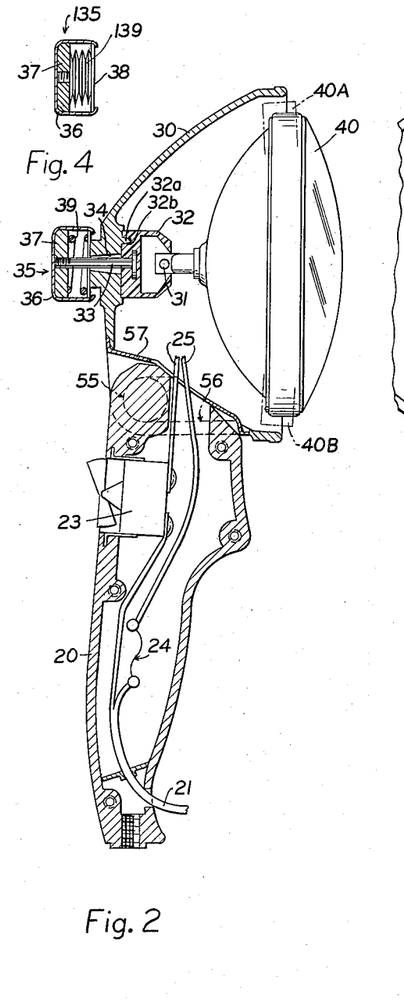
FIGURE 2 is a side sectional view showing an internal arrangement of parts.
FIGURE 4 is an alternate resilient nut construction.
Figure 3:
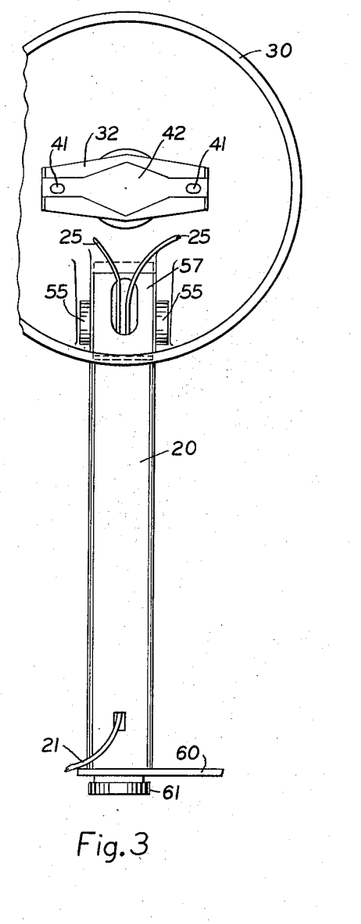
FIGURE 3 is a front view of the assembled holder with the lamp removed.

Referring more particularly to FIGURES 1 through 3, the improved holding means comprises two main assemblies; the handle 20, and the hood or housing 30. The handle 20 is formed generally in a manner which can be suitably grasped by the hand of the user. Its shape, characteristically, can be described as an extended pistol grip. From the handle 20 extends the electrical cord 21 with a conventional plug 22 adapted for use in a utility outlet. Within the handle 20, the cord 21 is divided, one end connecting to a conventional switch 23, the other end to a fuse 24. From switch 23 and fuse 24, leads 25 continue into the hood 30, and are arranged to assemble to lamp terminals 31. By use of a screw or similar means, the terminals 31 and leads 25 are fastened to a connector support 32 at locations 41. The connector support 32 is bar shaped with formed recess 42 to accept and encapsulate the lamp terminals 31. The rear part of the connector support 32 is adapted to seat in a socket formed in the hood 30.

For the purpose of keeping support 32 in a fixed orientation, the socket is formed with a pin 32a protruding therefrom. A corresponding pin receiving socket 32b is formed in support 32 and when assembled the pin 32a mates with socket 32b with a smooth disengaging fit.

A stud 33 is assembled to the connector support 32. This stud 33 passes through the tapered passageway 34 formed in the rear of hood 30. A spring nut 35 engages the stud 33, and when tightened is used to hold the connector support 32 in position. The spring nut 35 comprises an outer shell 36, and threaded nut plate 37 which is retained at the rear of the spring nut 35. A front pressure plate 38 is retained by the outer shell 36, and is movable within the shell 36. Between the nut plate 37 and pressure plate 38 is a coil spring 39.

The bulb 40 is attached to the connector support 32 at point 31. An assembly of the bulb 40 and connector support 32 is mounted in the hood 30 by passing the stud 33 through the tapered passageway 34. The assembly is retained in place by engaging the thread of nut plate 37 and tightening the nut 35 until the stud 33 is fully engaged. Thus assembled, the spring 39 is partially compressed and retains the bulb 40 in place. If the holder is struck or dropped, the bulb 40 can swing to positions indicated as 40A or 40B, the spring 39 compressing as required. As the spring 39 is compressed, the shock is largely absorbed, thus tending to save the bulb 40 from damage to either the internal element or glass shell.

It is to be noted that the plate 37 with the tapped hole therein may be replaced with a plate with a stud, similar to stud 33, attached thereto. The stud might also be attached to or be a part of shell 36. The tapped hole would then be transferred to the connector support 32. Either arrangement is equally effective; the illustrated construction being selected as a preferred assembly.

Of further import is the arrangement of the bulb 40 within the hood 30. The spacing of the bulb 40 away from the hood 30, as shown, permits the interior space to act as a heat flue while the bulb 40 is in operation. In smoke tests used to prove this efficient conformation; it was found that a space of from 3/16 to 1/4 inch between the bulb 40 and hood 30 with a comparatively enlarged back chamber, resulted in a very satisfactory natural flue evacuation of heat. This circulation is instrumental in keeping the temperature of the hood 30 at a substantially lower temperature than is found immediately adjacent to the back of the bulb 40.

In FIGURE 1 is illustrated the swiveling movement used to effect the tilting of the hood 30. The phantom outline shows the hood 30 tilted at nearly right angles to the handle 20. This swivel movement of course can stop at any intermediate point.

FIGURE 4 is illustrative of an alternate manner of construction whereby the alternate spring nut is designated as 135. In this alternate embodiment, the outer shell 36 has the threaded nut plate 37, and the front pressure plate 38, and between these plates is an assemblage of conical spring washers 139. This spring nut assembly 135 operates in every respect as does the spring nut 35 which utilizes the wound spring 39. Other resilient means could be employed as a replacement for the spring elements 39 illustrated in FIGURE 2, or 139 illustrated in FIGURE 4, and thus I do not limit my disclosure to the forms shown for the purpose of illustration.

Figure 5:
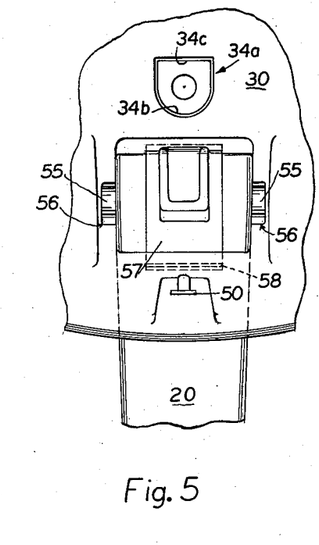
FIGURE 5 is a fragmentary front view of an alternative embodiment.
Figure 6:
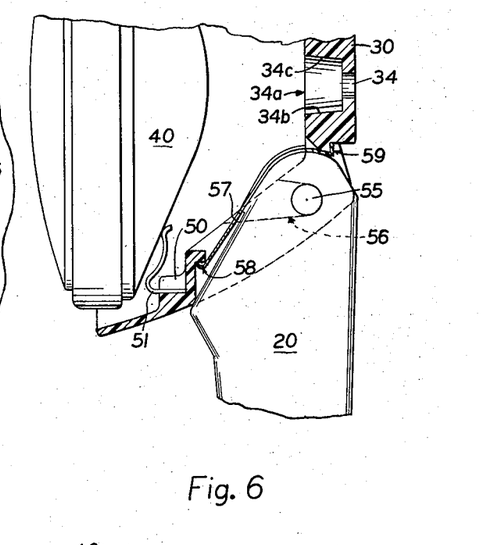
FIGURE 6 is a fragmentary sectional side view of the alternative embodiment shown in FIGURE 5.
Figure 7:
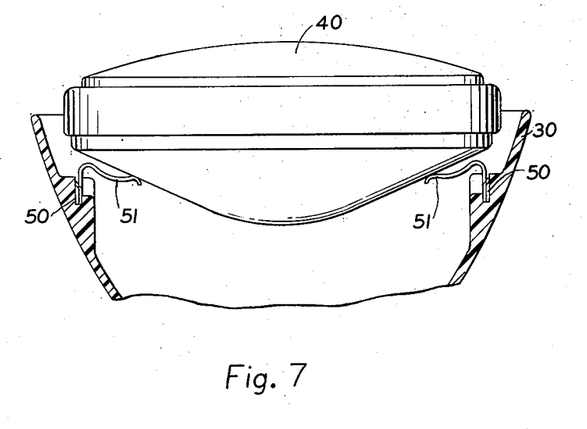
FIGURE 7 is a fragmentary sectional top view of the alternative embodiment shown in FIGURE 5.

FIGURES 5, 6 and 7 illustrate an alternate or additional means of providing additional spring means for the resilient support of, and to provide a shock mount for, the bulb 40. Within the hood 30 are formed a multiplicity of slots 50 as desired. These slots may be any suitable contour disposed to accept spring 51. The slots 50 as shown are much wider than high and have a depth sufficient for holding the spring 51 rigidly in position. The spring 51 as shown is of the flat spring class. One end has a straightened portion for fitting into slot 50. The spring 51 is then formed into an arc with the end terminating in an arc contact. The easy action of such a spring 51 gives a very satisfactory support and vibration dampening action.

On the handle 20 are pivots 55 which engage and are retained in formed slots 56. A spring 57, with formed ends 58 and 59, engages suitably formed abutments formed in hood 30. In operation, the handle 20 is brought into position wherein the pivots 55 are engaged in slots 56. The handle 20 is retained in this slot by the spring 57 which is held in place by the formed ends 58 and 59. The spring 57 not only holds the handle 20 in position, but also enables a frictionally controlled movement to occur; whereby the arc of the handle 20, which is concentric with the pins 55, contacts the spring 57. The arcuate contact thus formed provides both retention and friction. In this manner the hood 30 may be tilted in respect to the handle 20 in such manner as the operator desires.

It is of note that the retention means for holding the handle 20 in hood 30 is by the spring 57. This spring 57 is formed as a flat spring with both ends bent at substantially right angles. To enable wire leads 25 to pass from the handle 20 to the hood 30 an opening is shown in the spring 57. This opening in the spring may be of any desired conformation, but should be such as to have the strongest possible design compatible with an opening whereby the hood 30 may be moved to any of the positions available. In FIG. 5 is shown another embodiment of an orienting socket 34a having an arcuate portion 34b and a flat tapered shoulder 34c adapted to accept a connector such as 232 shown in FIGS. 14 and 17.

Figure 8:
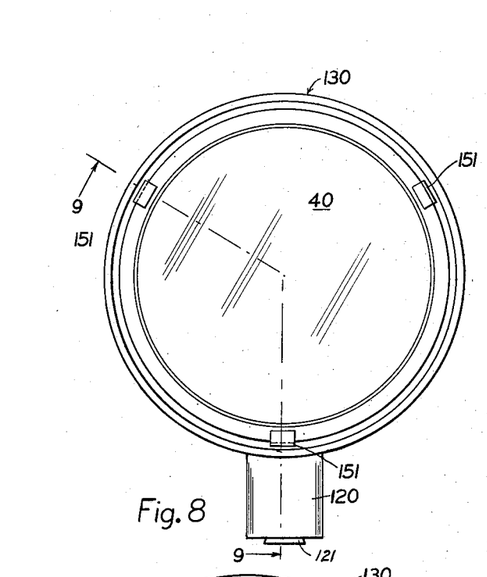
FIGURE 8 is a front view of an alternative resilient holding means.
Figure 9:
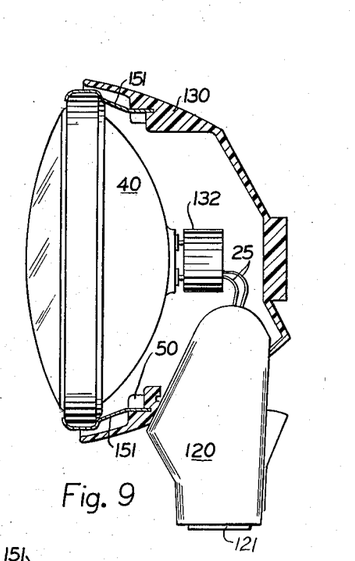
FIGURE 9 is a sectional view taken on the line 9—9 of FIGURE 8.

FIGURES 8 and 9 illustrate an alternate means for resiliently supporting the bulb 40. The handle 120 is similar to those of previous views, but is shortened for mounting on top of a camera. The tongue 121 of the handle 120 is illustrative of one manner of attachment to the top of a camera. The hood 130 is functionally the same as the hood designated 30 in previous views. It is noted that certain changes of design of the hood particularly in the rear are illustrated by the hood 130. In the hood 130 are the formed slots 50 disposed to accept and hold the springs 151. The springs 151 support and retain the bulb 40. In use the distending of the springs 151 outwardly permits the bulb 40 to be removed. In normal use the springs 151 locate the bulb 40 and also act as shock absorbing means. In this manner of assembly the connector support 32 is not used since no additional retention to the hood 130 is desired except that produced by spring 151. A connector 132 is illustrated accepting the pronged outlets on the bulb 40.

Figure 10:
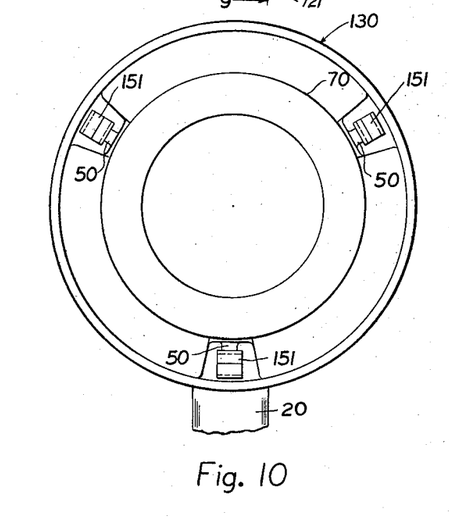
FIGURE 10 is a front view with lamp removed of another embodiment of the invention.
Figure 11:
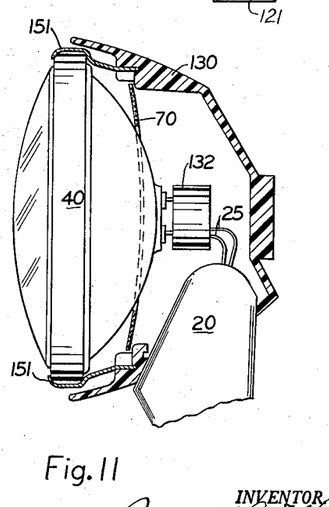
FIGURE 11 is a side view of the embodiment shown in FIGURE 10.

FIGURES 10 and 11 illustrate the use of an additional heat barrier 70 formed of a suitable material and adapted to fit to the inner conformation of the hood 130 at the point ahead of the lug formation for slots 50.

In the center of the heat barrier 70 is a cutout adapted to fit the lamp 40 at a point slightly ahead of the lamp electrical contacts formed on the back of lamp 40. The use of this heat barrier 70 is effective in those conditions where it is desirable to accelerate the flue action caused by the circulation of the air, and where it is desirable to keep that part of the hood 130 back of the barrier 70 at a cooler temperature than is found in the hood 130 when used without the barrier. This barrier 70 also has an additional effect in that it keeps dirt, moisture and small particles from entering the area of electrical connections and other functional parts.

The other elements shown in FIGURES 10 and 11 are the same as are shown in FIGURES 8 and 9 where the lamp 40 is retained in hood 130 by spring means 151. Said spring means 151 are retained by slots 50 in hood 130. The handle 20 is similar to those of previous views and the connector 132 is attached to wire leads 25 entering from handle 20 as explained above.

Figure 12:
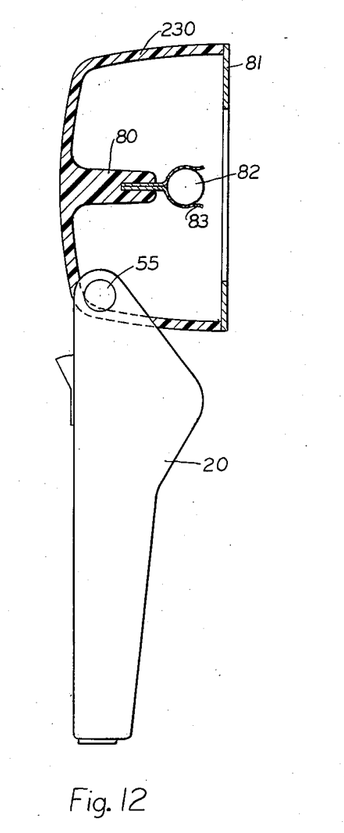
FIGURE 12 is a side view taken on the line 12—12 of FIGURE 13 and showing a holding device adapted for use with a tubular lamp.
Figure 13:
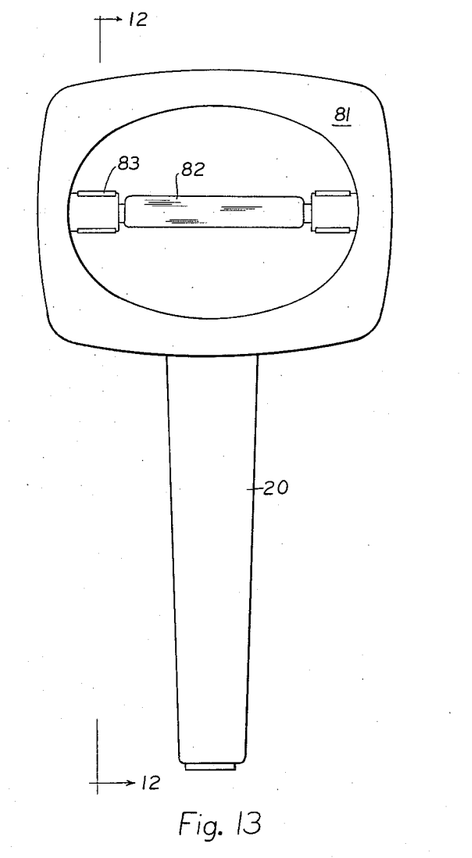
FIGURE 13 is a front view of the embodiment shown in FIGURE 12.

FIGURES 12 and 13 illustrate a variation in arrangement of parts whereby the hood is changed in conformation to the shape shown and illustrated as item 230. This change of the shape to form hood 230 is to accommodate tubularly shaped lamps. Among the practical arrangements of holding the tubular lamp designated 82 is the manner shown in FIGURE 12. Within the hood 230 is formed support stanchions 80 adapted to hold spring clips 83. The tube 82, while being retained in the predetermined position such as shown, is also resiliently supported by the spring clips 83. The manner of assembling the hood 230 with handle 20 is the same as shown and described above in FIGURES 5 and 6. The FIGURES 12 and 13 are illustrative of how the hood may be altered as to configuration. In this manner a hood adaptable to retain and protect a certain lamp may be made. A hood such as hood 230 is made with formed slots to receive the pivots 55, and by spring means the handle is retained in the hood in such a manner as to permit the hood to tilt as desired.

FIGURES 14, 15, 16 and 17 illustrate an alternate concept of assembly and manufacture whereby the versatility of the inventive concept is elaborated. The hood 330 is similar to the hood 30 shown in FIGURES 2 and 3 but in hood 330 are formed recesses 90 adapted to receive contact clips 91. These clips are attached to lead wires 25. Connector support 232 is similar to support 32 described above. Of note is the threaded annulus adapted to receive threaded thumb screw 235. In use the thumb screw 235 draws the connector support 232 into full engagement whereby the connector support 132 bottoms on the mating recess formed in hood 330.

Figure 14:
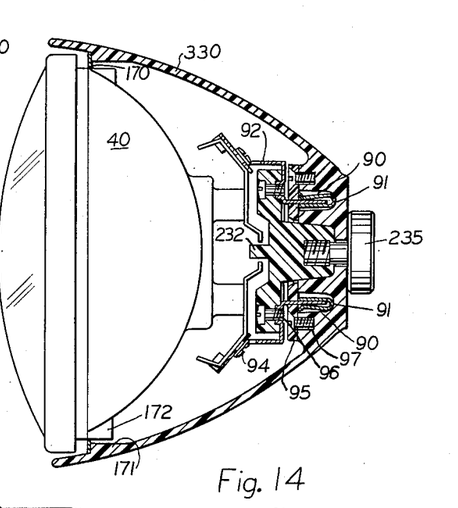
FIGURE 14 is a top sectional view showing a further embodiment of the invention.
Figure 16:
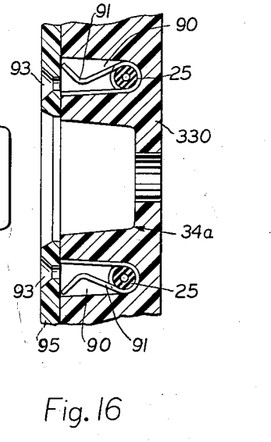
FIGURE 16 is a partial sectional view of an alternate connection assembly.
Figure 17:
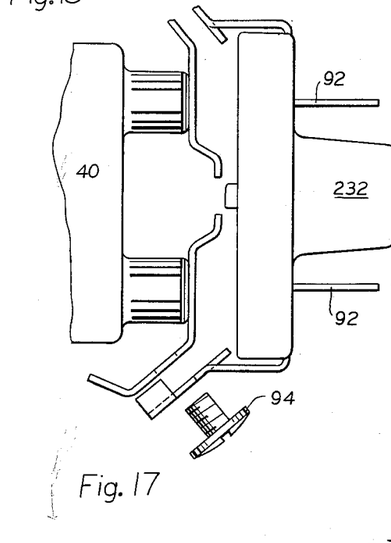
FIGURE 17 is an exploded top view showing the relationship of the various elements used in the connection assembly of FIGURE 16.

Affixed to the connector support 232 is prong connectors 92 arranged to pass through cover slots 93 and engage contact clips 91. This prong connector also has extended ears with access holes therein whereby the attaching screw 94 attaches the assembly to lamp 40. Cover plate 95 serves as both an insulator and also as a retainer of clips 91.

Figure 15:
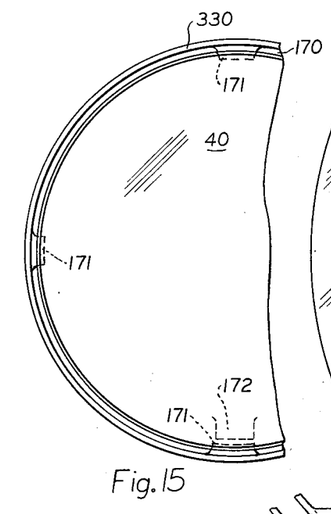
FIGURE 15 is a partial front view showing the arrangement of a further heat baffle arrangement.

In FIGURES 14 and 15 are shown an alternate heat barrier 170 located at a forward location. This alternate is made to accommodate those bulbs 40 which have a high internal reflective back wall. This type of bulb 40, with the highly reflective internally coated back wall, operates with the front at higher than normal temperatures and with the back at lower than normal temperatures. With this result it is highly desirable to have a barrier 170 that also serves as a locator and dust shield. This barrier is retained by lugs 171 formed in hood 330. The barrier 170 will also have a locator notch to accommodate the locator lug 172 as cast on the bulb 40.

To use this manner of assembly the bulb 40, as received, is attached to connector support 132 by means of attaching screws 94 affixing the bulb 40 to the prong connectors 92. The contact clips 91, attached to lead wires 25, are placed in recess 90 and cover plate 95 is affixed to hood 330 by means of screws 97.

The prong connectors 92, affixed to the connector support 232 by means of screws 96, are now aligned to enter the cover slots 93. The bulb 40 with connector support 132 and the other elements assembled thereto is pushed into place so that the prongs of prong connectors 92 engage contact clips 91, thus completing the electrical circuit.

To retain the assemblage in place the thumb screw 235 is engaged in the threaded portion of connector support 232 and the connector support 132 is drawn firmly into the socket of hood 330. The heat barrier 170 engaging both the shoulder of lamp 40 and the lugs 171 acts as both a shock mount to prevent undue side motion of the lamp 40 and also as a heat and dust shield.

*Operation and Use*

The lamp assembly can be hand held or, by means of a conventional mounting bar 60 retained by threaded screw 61, can be attached to a camera so as to be held as a unit. As is shown by the various views, the light source as now illustrated is small and easily supported or hand held. The multiplicity of bulbs either assembled on a bar or otherwise arranged are less convenient than the new single high intensity source held as illustrated.

With any small camera mounted to the bar 60, the whole assembly can be held by grasping handle means 20. To direct the light directly toward the subject being photographed, the new and improved holding means is used as shown in FIGURE 1. If a "bounce" light is desired the hood 30 is tilted back to the required angle which may approach nearly a right angle to the handle 20. The unit is plugged into any convenient source of electrical supply compatible with the bulb being used. The switch 23 is operated and the bulb 40 is lit. The camera is used in the conventional manner.

Particular note is made of several innovations made to more efficiently utilize the advantages and improvements provided by my invention. The handle 20, when it engages the hood 30, has a formed radiused end with a small flat thereon. This radius is generated around the center of the pivot pins 55 which are affixed to the handle 20. The hood 30 can be moved to any desired position within the limitations of the arc and the spring 57 will exert enough friction to retain the hood 30 in the angular relationship established. Since many photographers seem to prefer an approximation of 45 degrees when using a light source in a combined "frontal" and "bounce" position, the flat formed into the generated radius establishes a ready reference. It is further noted that natural stops limiting the angular disposition of the hood 30 are provided by the formation of the hood 30 and the handle 20.

As illustrated in FIGURE 6, the handle contacts the hood 30 at a point near the lip accepting the formed end 58 of spring 57. When the hood 30 is rotated to the other extreme as shown in phantom in FIGURE 1 in which it is at approximately right angles to handle 20, the protruding rear boss of the hood 30 is brought in contact with the back of the handle 20.

It is also of import to note that the wire leads 25 are brought through an opening in the handle 20 and spring 57 in such a manner as illustrated as to require a minimal amount of slack in the leads 25. By the arrangement as best shown in FIGURES 2, 14 and 16, the electrical connections and wires are effectively shielded from accidental contact by the operator or user. When the lamp 40 is mounted as illustrated by FIGURE 9, the connector 132 is of a style such as to be self-shielding in the manner of all common female receptacles in which the contacts are enclosed with access ports to receive the male prongs on the lamp 40.

The spring means 51 shown in FIGURE 7 is by illustration the preferred manner of construction but any conformation is satisfactory if an angular deflection and a soft action is generated.

To change bulb 40 in the assemblage shown in FIGURES 1 through 3, the nut 35 is unscrewed from stud 33. The bulb 40 with the connecting support 32 attached is brought forward out of the hood 30 and the lamp 40 removed from connecting support 32 and a new lamp 40 attached.

In an assembly such as shown in FIGURES 8 and 9, the changing of lamp 40 is accomplished by pushing the bulb 40 towards any two springs 151 and lifting the third spring 151 so that the bulb 40 is tipped outward from hood 130 and removed from the holding action of the other two springs 151. After removal from the hood 130, the connector block 132 is disengaged from the bulb 40.

Other manners of assembly as used in FIGURES 12 through 16 have been described above in connection with the description of each figure.

Although I have described my invention in detail and therefore utilized certain specific terms and languages herein, it is to be understood that the present disclosure is illustrative, rather than restrictive, and that changes and modifications may be resorted to without departing from the spirit or scope of the claims appended hereto.

I claim:

1. In combination, an incandescent lamp-holder for removably-mounted lamps and having a hood adjustably and pivotally mounted on a support and comprising a hood support means, a pair of pivots attached to the support means, a lamp-shielding hood having internally-formed pivot-receiving sockets and being detachably-mounted on said pivots, clip-retaining means formed in said hood, a resilient clip-member formed for detachably mounting in the clip-retaining means, the clip-member mounted in the retaining means and having the intermediate portion thereof bowed out of its normal plane by slidable engagement with the support means, the spring bias of the bowed mounted clip urging the pivoted support means into the pivot-receiving, socketed hood and retaining the support means in mounted position in the hood, means for limiting the angular movement of said hood in relationship to the support means, frictional retaining means for maintaining the hood and support means at one of an infinitely-selectable angular position within said angular limiting means, a removably-mounted lamp mounted in said hood, resilient lamp-supporting means for maintaining said lamp in spaced relationship with the inside of the hood to provide an air circulation space between the rear of the lamp and the hood, and means to removably retain the lamp in the hood.

2. The lamp-holder combination of claim 1 wherein the resilient lamp-supporting means are a plurality of removably-mounted lamp-supporting springs and wherein there are formed in the hood means to receive and removably retain the lamp-supporting springs to form a resilient lamp-supporting platform, and wherein there is a support member removably attached to the lamp, a seat formed on the support member, a seat-receiving means adapted to retain the seat of the support member formed in the hood and means removably retaining in engaged position the seat of the support member in the seat-receiving means of the hood.

3. The lamp-holder combination of claim 2 wherein the seat-receiving means includes a passageway through the hood and wherein the means to retain the support member in the seat-receiving means includes a threaded member having one end threaded and attached to the support member, the threaded member extending through and being slidably retained by the passageway, and a spring-nut detachably mounted on the threads of the threaded member extending beyond the hood, said nut rotated thereon to draw into and retain the seat of the support member in the hood seat-receiving means.

4. The lamp-holder combination of claim 3 wherein an orienting member is provided on the seat of the support member and an orienting-member receiving portion is provided in the seat-receiving means of the hood, the orienting member engaging and mating with the orienting-member receiving portion to hold the mounted support member in preselected relationship to said hood.

5. The lamp-holder of claim 4 wherein said spring-nut comprises a retaining shell, a threaded-nut element mounted in fixed relationship within the shell, a movable pressure-plate slidable in and retained by the shell, and means for urging the pressure-plate away from the threaded-nut element, the threaded-nut element engaging the threads of the threaded member.

6. An incandescent lamp-holder for removably mounted lamps and having a hood adjustably and pivotally mounted on a handle and comprising in combination; a handle, a pair of pivots attached to the handle, a lamp-shielding hood having an open face and a closed back and having internally-formed pivot-receiving sockets and being detachably mounted on said pivots, a biasing means removably mounted in said hood and engaging said handle to urge the pivoted handle into the pivot-receiving socketed hood to retain the handle in the mounted position in the hood, means for limiting the angular movement of the hood in relationship to the handle, frictional retaining means for maintaining the hood and handle in one of an infinitely-selectable angular position within said angular limiting means, a removably mounted lamp mounted in said hood, resilient lamp-supporting means for maintaining said lamp in spaced relationship with the inside of the hood, a dust and heat barrier plate removably mounted within the hood to keep the interior of the hood behind the barrier free from dust and heat, the plate having the outside formed to fit the inside of the hood at a preselected position intermediate the open face and the back and having the inside formed to fit the outside of a mounted lamp portion at a preselected position within the hood, and means to removably retain the lamp in the hood.

7. The lamp-holder of claim 6 wherein there is provided a support member removably attached to the lamp, an orienting seat formed on the support member and an orienting-seat receiving means provided in the hood and engaging and mating with the orienting-seat of the support member to hold said member in preselected relationship to said hood.

8. An incandescent lamp-holder for removably-mounted lamps and having a hood adjustably and pivotally mounted on the handle and comprising in combination; a handle element, pivots attached to the handle element, a lamp-shielding hood element having internally-formed pivot-receiving sockets and being detachably mounted on said pivots, a spring means removably mounted in the hood element and engaging and being bowed from normal position by a portion of the handle element, the spring means urging the pivoted-handle element into the pivot-receiving socketed hood element to retain the handle element in the mounted position in the hood element, means formed in the hood element to engage the handle element to limit the angular movement of the hood element in its relationship to the handle element, frictional means mounted between the hood element and handle element to engage one of said elements to maintain the hood element and handle element at one of an infinitely-selectable angular position within the angular limiting means, a lamp, resilient lamp-supporting means for maintaining the lamp in spaced relationship with the inside of the hood element to provide an air circulation space between the rear of the lamp and the hood element, a support member supporting said lamp thereon and an orienting-seat formed on said member, an orienting seat-receiving means formed in the hood element and engaging and retaining the seat of the support member, means to retain the oriented seat of the support member in the orienting seat-receiving means of the hood element, electrical contacts on said lamp, electrical contacting and conducting means in the support member engaging the electrical contacts of the lamp, electrical connecting means in the hood element disengageably engaging the electrical conducting means of the support member and a plug and electrical conducting means carried through said handle element and attached to the hood electrical connecting means.

9. A lamp-holder as in claim 8 wherein the hood element seat-receiving means has a passageway therein and extending through the hood element, a threaded receiving means formed in the support member, and a thumb screw mounted in said passageway the thumb portion being on the outside of the hood element and the other end extending through the hood element and threaded into the receiving means of the support member and manipulated to draw the support member into oriented seat mounted position.

References Cited in the file of this patent

UNITED STATES PATENTS

| | | |
|---|---|---|
| 2,146,011 | Dame | Feb. 7, 1939 |
| 2,267,707 | Bosten | Dec. 20, 1941 |
| 2,401,366 | Muldoon | June 4, 1946 |
| 2,459,151 | Curtis | Jan. 18, 1949 |